United States Patent Office 3,199,948
Patented Aug. 10, 1965

3,199,948
PROCESSING OF KAINITIC MINERALS
Alberto Scarfì and Emanuele Gugliotta, Milan, Italy, assignors to Sincat Soc. Industriale Catanese S.p.A., Palermo, Italy
No Drawing. Filed June 19, 1962, Ser. No. 203,438
Claims priority, application Italy, June 28, 1961, 665,329
5 Claims. (Cl. 23—38)

This invention relates to the processing of kainitic minerals to obtain potassium sulphate and/or potassium chloride.

The major obstacles to the treatment of kainitic minerals for obtaining potassium sulphate and potassium chloride arise from the practical impossibility of reaching the equilibria postulated by the theory concerning the reaction products of kainite; the velocity with which kainite crystals dissolve, which is, in any event, low in water when compared to that of sodium chloride, drops steeply as the reaction proceeds, reaching values close to zero for $MgCl_2$=solution concentrations remote from those prevalent at the equilibrium concentration.

The equilibria quoted in the literature refer, in general, to conditions reached after 15 days of stirring in the presence of a kainite bottom body (Autenrieth, Neue fuer die Kalirohsalzverarbeitung, etc., Kali und Steinsalz—1955—H. 11).

The velocity with which the kainite crystal dissolves is further reduced if the process is carried out in the presence of NaCl (crude kainitic minerals), since the NaCl, which dissolves faster than the kainite, leads to a rise in the chloride ion concentration in the solution and hence to a slowing down of the dissolution of the kainite as a consequence of the Law of Mass Action.

For this reason, all the known processes for treating kainite provide for a preliminary enrichment, generally by flotation, which involves an appreciable processing cost and considerable losses of potassium.

It follows that the yields obtainable in any processing process based on equilibria in solution will be very much lower than those resulting from theoretical calculations.

For example, the process which gives the maximum theoretical yield in potassium sulphate through the reaction between kainite and sylvite (according to known processes) gives in practice a yield of about 72%, as against the 83.18% calculated.

Since the obstacle in the way of achieving equilibrium is related to the structural properties of the kainite crystal, no substantial advantages can be expected from the influence of physical factors (e.g., contraflow reactions, stirring, reaction temperature, degree of grinding, etc.)

It is the principal object of the present invention, therefore, to provide an improved method of recovering potassium chloride and potassium sulphate from kainitic minerals.

It has been found, according to the present invention, that if kainitic mineral is subjected to a heat treatment before employing it in any wet-processing cycle, it is not only possible to reach rapidly the theoretical equilibrium, but also to reach metastable equilibria which are more favourable from the standpoint of the potassium yield, whether using enriched kainitic mineral or the crude mineral with a high NaCl content.

This derives from the fact that the thermal treatment destroys the crystalline aspect of the mineral by partial or complete dehydration; the elimination of the kainite bottom body thus brought about removes the impediment due to the crystalline structure of the mineral which obstructs its capacity to react.

Therefore, after the thermal treatment, the mineral dealt with is not the usual kainite but another crystalline form (which may be called anhydrous kainite) which permits attainment in solution, of the equilibria concerning mixtures of KCl and $MgSO_4$, equilibria which are much more desirable from the standpoint of the potassium yield in that the brines are richer in $MgCl_2$ and hence poorer in potassium.

This thermal activation must be carried out, according to the invention, on crushed mineral at temperatures higher than 70° C. and for times sufficient to enable all or some of the space-lattice water but only small quantities of the hydrochloric acid to be eliminated.

The higher the activation temperature the shorter the time required to obtain a sufficient removal of the water.

Excellent results have been obtained during the operation of decomposing kainite to schoenite by carrying out the thermal pre-treatment of kainitic mineral with 65% kainite and 35% NaCl, crushed under 4 mesh, in a rotary kiln with direct flame heating at temperatures within the range from 130° to 190° C. and for times ranging from 20 to 5 minutes respectively.

It has been seen that under these conditions about a quarter of the water of crystallization contained in the kainite crystal is driven off without any appreciable losses of HCl occuring. The grain size and shape remain practically unchanged: the kainite crystal becomes opaque as a consequence of the tiny cracks which can be seen under the microscope.

Besides those obtained in a rotary kiln, good thermal-activating conditions have also been obtained using fluid-bed ovens; good results are also obtained with ovens of other types such as those with a plurality of levels.

Excellent results have also been obtained by crushing the mineral to a particle size lower than 4 mesh and activating the crude kainitic mineral of under 5 inch size in a single stage with a rotary mill of the "Aerofall" type in a closed hot-air system at a temperature of 150–190° C.

The invention will be illustrated by a few examples of the conversion of kainite to schoenite, using brines derived from two typical processing cycles—the metathesis and the combined conversion cycles—for attacking the kainite.

The quantitative examples given do not in any way have the object of limiting the validity and the scope of the process according to the invention.

Examples 1, 3, 5 and 7 are given only for comparison purposes whereas Examples 2, 4, 6 and 8 illustrate the advantages of the thermal pre-treatment stage.

*Metathesis cycle.*—The metathesis cycle for the processing of kainite is based on the use of kainite and KCl for obtaining potassium sulphate.

The cycle can be summarized as follows:

Stage 1.—Production of potassium sulphate and sulphate mother liquors (metathesis brine) by reaction with water and potassium chloride, at temperatures ranging from 20 to 30° C., of a mixture of schoenite and KCl obtained in a previous operation.

Stage 2.—Production of a mixture of schoenite and KCl and a schoenite brine by reacting, at temperatures ranging from 20 to 30° C., the metathesis brine obtained in stage 1 with enriched kainite (containing less than 10% of NaCl.)

The schoenite—KCl mixture thus obtained is recycled into Stage 1 with the addition of water and KCl, whilst the schoenitic brine is discarded or used for other processes.

In practice, according to known processes, it is not possible to obtain complete conversion of kainite to schoenite, so that metathesis stage (Stage 1) is carried out in the presence of kainite, and this involves a lowering of the $K_2O$ yield of the whole cycle.

An example of the conversion of flotated kainite to schoenite by means of a metathesis brine, derived from the processing of potassium sulphate according to the process summarized hereinabove is given below.

Example 1

104.98 grams of kainitic concentrate (kainite 100 g., NaCl 4.98 g.) obtained by the flotation of crude kainitic mineral containing 65% kainite and 35% NaCl and having a grain size between 250 and 28 mesh, are treated with 159.54 grams of metathesis brine coming from a cycle of potassium sulphate processing and having the following percentage composition by weight:

$K=7.61\%$, $Mg=2.81\%$, $Na=0.36\%$, $Cl=12.48\%$, $SO_3=4.30\%$, $H_2O=72.43\%$

After stirring the resulting slurry for 5 hours at a temperature of 25° C., there are formed 97.02 grams of bottom mass consisting of:

13.29 g. KCl
52.35 g. schoenite
31.38 g. unconverted kainite, and 167.50 g. schoenitic mother liquors having the following composition by weight:

$K=3.46\%$, $Mg=4.79\%$, $Na=1.52\%$, $SO_4=5.00\%$, $Cl=15.75\%$, $H_2O=69.48\%$

Conversion yield (in terms of potassium recovered from all sources containing potassium)=

$$\frac{K_{KCl}+K_{schoenite}}{K_{input\ kainite}-K_{uncon.\ kainite}+K_{met.\ brine}}=74.77\%$$

Example 2

If, on the other hand, the operation hereinabove described is carried out with kainite which has undergone thermal pre-treatment according to the new process, the following results are obtained:

104.98 grams of kainitic concentrate (100 g. of kainite and 4.98 grams of NaCl) obtained by flotation of crude kainitic mineral containing 65% kainite and 35% NaCl and having a size between 250 and 28 mesh, are subjected to thermal treatment at a temperature of 150° C. in a rotary kiln heated by a direct flame for a contact time of 10 minutes. The heating involves a loss in weight of kainitic mineral of 5.51%.

The activated product is thereafter treated with 159.54 grams of metathesis brine having the following percentage composition by weight:

$K=7.61\%$, $Mg=2.81\%$, $Na=0.36\%$, $Cl=12.48\%$, $SO_4=4.30\%$, $H_2O=72.43\%$

After two hours of stirring at a temperature of 25° C. there are formed 92.03 grams of bottom mass consisting of:

74.30 g. schoenite
17.73 g. KCl, and 166.70 grams schoenitic brine having the following percentage composition by weight:

$K=2.47\%$, $Mg=5.87\%$, $Na=1.51\%$, $SO_4=6.01\%$, $Cl=17.25\%$, $H_2O=66.87\%$

Conversion yield = $\frac{K_{KCl}+K_{schoenite}}{K_{input\ kainite}+K_{metathesis\ brine}}=85.18\%$ The advantages deriving from the new process are therefore:

(a) An increase in the conversion yield from 74.77% to 85.18%;

(b) Total conversion of the kainite to schoenite and hence a greater yield in the metathesis stage even though a lower specific quanity of metathesis brine is used;

(c) A reduction in the conversion time from 5 to 2 hours.

Example 3

If the conversion of crude kainite to schoenite is carried out without performing the preliminary operation of enriching by flotation in order to eliminate the rock salt, the conversion reaction is further slowed down as appears from the data which will now be given.

153.85 grams of crude kainite containing 65% kainite and 35% NaCl, having a size between 250 and 28 mesh, are treated with 159.54 g. of metathesis brine having the following percentage composition by weight:

$K=7.61\%$, $Mg=2.81\%$, $Na=0.36\%$, $Cl=12.48\%$, $SO_4=4.30\%$, $H_2O=72.43\%$

After 5 hours of stirring at a temperature of 25° C., there are formed 140.36 grams of bottom mass consisting of:

13.49 g. KCl,
41.24 g. schoenite,
43.24 g. unconverted kainite,
42.39 g. NaCl, and 173.03 grams of schoenitic brine having the following percentage composition by weight:

$K=3.46\%$, $Mg=4.35\%$, $Na=2.95\%$, $SO_4=5.25\%$, $Cl=16.50\%$, $H_2O=67.49\%$

Conversion yield =

$$\frac{K_{KCl}+K_{schoenite}}{K_{input\ kainite}-K_{unconv.\ kainite}+K_{met.\ brine}}=71.59\%$$

Example 4

If the conversion is carried out with crude kainite which has undergone heat pre-treatment, the following results are obtained:

153.85 grams of crude kainite containing 65% kainite and 35% NaCl and having a size between 250 and 28 mesh, are heat treated at a temperature of 150° C. in a direct-flame rotary furnace for a contact time of 10 minutes. The heating involves a loss in weight of kainitic mineral of 3.60%.

The activated product is then treated with 159.54 grams of metathesis brine having the following percentage composition by weight:

$K=7.61\%$, $Mg=2.81\%$, $Na=0.36\%$, $Cl=12.48\%$, $SO_4=4.30\%$, $H_2O=72.43\%$

After two hours of stirring at a temperature of 25° C. there are formed 127.96 grams of bottom body consisting of:

74.0 g. schoenite
17.00 g. KCl
48.88 g. NaCl, and 167.43 grams of schoenitic brine having the following percentage composition by weight:

$K=2.69\%$, $Mg=5.85\%$, $Na=1.51\%$, $Cl=17.39\%$, $SO_4=5.98\%$, $H_2O=66.58\%$

Conversion yield = $\frac{K_{KCl}+K_{schoenite}}{K_{input\ kainite}+K_{metathesis\ brine}}=83.80\%$ As may be noted, in the case in which the reaction is carried out with activated kainite 2 hours are still sufficient for obtaining approximately the same equilibria as in Example 2.

*Combined conversion cycle.*—The combined conversion cycle for the processing of kainite is based on the use of kainite alone for the production of potassium sulphate.

The cycle can be summarized as follows:

Stage 1.—Production of $K_2SO_4$ and sulphate mother liquors by the reaction between schoenite, derived from a previous operation, and water, at temperatures ranging between 25° C. and 50° C., preferably 45° C.

Stage 2.—Production of schoenite and schoenitic brine by reacting, at temperatures ranging from 20° to 30° C., enriched kainite (containing less than 10% of NaCl) with sulphate brine coming from Stage 1. The schoenite thus obtained is wholly or partially recycled in Stage 1 for the production of K₂SO₄, whilst the schoenitic brine is discarded or used for other processes.

Example 5

This is an example of the conversion of flotated kainite to schoenite by means of the use of sulphate brine derived from the production of potassium sulphate according to the process summarized above.

104.61 grams of kainitic concentrate (kainite 100 g., NaCl 4.61 g.) obtained by means of the flotation of the crude kainitic mineral containing 65% kainite and 35% NaCl and having a size between 250 and 28 mesh, are treated with 129.28 g. of sulphate mother liquors coming from a potassium sulphate processing cycle and having the following percentage composition by weight:

$K=5.70\%$, $Mg=3.20\%$, $SO_4=19.64\%$,
$H_2O=71.46\%$

After 5 hours of stirring the resulting slurry at a temperature of 25° C. there are formed 108.60 grams of bottom mass consisting of:

75.71 g. schoenite
32.89 g. unconverted kainite, and 125.30 g. of schoenitic brine having the following percentage composition by weight:

$K=2.55\%$, $Mg=4.88\%$, $Na=1.45\%$, $Cl=9.97\%$,
$SO_4=12.09\%$, $H_2O=68.92\%$

Conversion yield =

$$\frac{K_{schoenite}}{K_{input\ kainite}-K_{uncon.\ kainite}+K_{sulph.\ brine}}=82.06\%$$

Example 6

If, on the other hand, the operation described hereinabove is carried out with kainite subjected to heat pretreatment according to the new process the following results are obtained:

104.61 grams of kainitic concentrate (kainite 100g., NaCl 4.61 g.) obtained by floating crude kainitic mineral containing 65% kainite and 35% NaCl and having a size between 250 and 28 mesh, are subjected to heat treatment at a temperature of 150° C. in a rotary oven heated by a direct flame, for a contact time of 10 minutes.

The heating involves a loss of weight of 3.60%.

The activated product is then treated with 129.28 g. of sulphatic mother liquors having the following percentage composition by weight:

$K=5.70\%$, $Mg=3.20\%$, $SO_4=19.64\%$,
$H_2=71.46\%$

After 2 hours of stirring the resulting slurry at a temperature of 25° C. there are formed 121.92 grams of bottom body consisting of:

105.22 g. schoenite
16.70 g. MgSO₄·7H₂O, and 106.18 g. of schoenitic mother liquors having the following percentage composition by weight:

$K=2.48\%$, $Mg=5.56\%$, $Na=1.71\%$, $Cl=16.05\%$,
$SO_4=6.84\%$, $H_2O=67.36\%$

Conversion yield =

$$\frac{K_{schoenite}}{K_{kainite}+K_{sulphate\ brine}}=88.59\%$$

Example 7

If the rock salt is not eliminated by flotation, a slowing down of the conversion velocity of kainite to schoenite is noted as is evident from the following quantitative values.

153.85 g. of crude kainite mineral containing 65% of kainite and 35% of NaCl and having a particle size between 250 and 28 mesh are treated with 129.28 g. of sulphate brine of the following percentage composition by weight: $K=5.70\%$; $Mg=3.20\%$; $SO_4=19.64\%$; $H_2O=71.46\%$:

After 5 hours of stirring the resulting slurry at 25° C., 148.94 g. of bottom mass is formed, having the following composition:

60.64 g. of schoenite
44.64 g. of kainite
43.66 g. NaCl, and 134.18 g. of schoenitic mother liquors of the following percentage composition by weight:

$K=3.19\%$, $Mg=4.38\%$, $Na=2.99\%$, $Cl=10.48\%$,
$SO_4=13.28\%$, $H_2O=65.68\%$

Conversion yield =

$$\frac{K_{schoenite}}{K_{input\ kainite}-K_{unconverted\ kainite}+K_{sulph.\ brine}}=73.31\%$$

Example 8

If, instead, the crude kainite undergoes a preliminary thermal activation treatment, all the kainite is converted to schoenite even if the stirring time is under 2 hours. The results obtained are given below.

153.85 grams of crude kainitic mineral containing 65% kainite and 35% NaCl and having a size between 250 and 28 mesh are subjected to thermal treatment at a temperature of 150° C. in a rotary oven heated by a direct flame for a contact time of 10 minutes.

The heating involves a loss of weight by the kainitic mineral of 3.60%.

The activated product is then treated with 129.28 g. of sulphatic brine having the following percentage composition by weight: $K=5.70\%$, $Mg=3.20\%$, $SO_4=19.64\%$, $H_2O=71.46\%$.

After 2 hours of stirring at a temperature of 25° C. there are formed 171.14 g. of bottom body consisting of:

104.82 g. schoenite
17.22 g. MgSO₄·7H₂O
49.10 g. NaCl, and 106.20 g. of schoenitic brine having the following percentage composition by weight:

$K=2.25\%$, $Mg=5.53\%$, $Cl=16.12\%$, $SO_4=6.83\%$,
$H_2O=67.21\%$

Conversion yield = $\frac{K_{schoenite}}{K_{kainite}+K_{sulphatic\ brine}}=88.26\%$

What is claimed is:

1. A method of processing crystalline kainitic minerals to extract potassium sulphate and potassium chloride therefrom, comprising the steps of heating said minerals in the absence of externally supplied water to a temperature between substantially 130° C. and 190° C. to release a minor fraction of the water of crystallization from the partially dehydrated minerals; and thereafter treating said minerals with an aqueous reaction medium; and recovering from the reaction products of said minerals and said medium, the said potassium sulphate and potassium chloride.

2. A method of processing crystalline kainitic minerals to extract potassium sulphate and potassium chloride therefrom, comprising the steps of heating said minerals in the absence of externally supplied water to a temperature between substantially 130° C. and 190° C. for a period ranging between substantially 5 and 20 minutes to release a minor fraction of the water of crystallization from said minerals; thereafter treating the partially dehydrated minerals with an aqueous reaction medium; and recovering from the resulting reaction mixture of said medium and said minerals, the said potassium sulphate and potassium chloride.

3. A method of processing crystalline kainitic minerals to extract potassium sulphate and potassium chloride therefrom, comprising the steps of heating said minerals in the absence of externally supplied water to a temperature between substantially 130° C. and 190° C. for a period ranging between substantially 5 and 20 minutes to release between substantially one-quarter and one-third of the water of crystallization from said minerals; thereafter treating the partially dehydrated minerals with an aqueous reaction medium; and recovering from the resulting reaction mixture of said medium and said minerals, the said potassium sulphate and potassium chloride.

4. A method of processing crystalline kainitic minerals to extract potassium sulphate and potassium chloride therefrom, comprising the steps of crushing said minerals to a particle size less than substantially 4 mesh; simultaneously heating said minerals in the absence of externally supplied water to a temperature between substantially 130° C. and 190° C. for a period ranging between substantially 5 and 20 minutes to release a minor fraction of the water of crystallization from said minerals; thereafter treating the partially dehydrated minerals with an aqueous reaction medium; and recovering from the resulting reaction mixture of said medium and said minerals, the said potassium sulphate and potassium chloride.

5. A method of processing crystalline kainitic minerals to extract potassium sulphate and potassium chloride therefrom, comprising the steps of crushing said minerals to a particle size less than substantially 4 mesh; simultaneously heating said minerals in the absence of externally supplied water in a hot-gas mill to a temperature between substantially 130° C. and 190° C. for a period ranging between substantially 5 to 20 minutes to release between substantially one-quarter and one-third of the water of crystallization from said minerals; thereafter treating the partially dehydrated minerals with an aqueous reaction medium; and recovering from said medium the said potassium sulphate and potassium chloride.

References Cited by the Examiner

UNITED STATES PATENTS

| 1,794,551 | 3/31 | Schoch | 23—38 |
| 1,952,289 | 3/34 | Schoch | 23—38 |
| 2,033,149 | 3/36 | Partridge et al. | 23—38 |
| 2,766,885 | 10/56 | Marullo | 23—121 X |
| 2,902,343 | 9/59 | Saccardo | 23—89 X |

MAURICE A. BRINDISI, *Primary Examiner.*